March 26, 1935.      D. R. DOWLING      1,995,971
DRENCHING GUN
Filed Oct. 2, 1934

Inventor:
Dudley Russell Dowling
By
Attorney

Patented Mar. 26, 1935

1,995,971

UNITED STATES PATENT OFFICE 1,995,971

DRENCHING GUN

Dudley Russell Dowling, Graceville, near Brisbane, Queensland, Australia

Application October 2, 1934, Serial No. 746,570
In Australia November 13, 1933

4 Claims. (Cl. 128—223)

This invention relates to an improved drenching gun, and has for its object the provision of a cheaply constructed, efficient and simply operated device for administering medicinal fluids to animals, particularly sheep, for eradicating stomach worms and for treating other ailments.

The invention comprises a pair of telescoping tubes each closed at their outer end except for valved pipes, the pipe from the outer end of the larger tube leading to a container mounted upon the back of the operator, and the other pipe adapted for insertion in the animal's mouth.

Each pipe is provided with a non-return valve and the telescoping tubes are normally held extended by a spiral spring which may be within them. Upon the larger tube a hand piece, and upon the smaller tube a trigger or lever are mounted so that normally when the two tubes are extended by the spring they are apart a suitable distance.

Upon the top of the larger tube I provide a boss and upon the smaller tube a lug. A graduated gauge rod parallel with the telescoping tubes is secured in the said lug and moves freely in the said boss. The end of the gauge rod which passes through the boss is threaded and a nut is provided for adjusting the gauge rod relative to the boss. In addition I provide upon the hand piece an adjustable set screw and locking nut for limiting the travel of the hand piece and trigger towards each other and thereby enabling zero to be accurately determined upon the gauge rod, and if necessary a compensating compression spring between the said hand piece and trigger.

The invention will be described with reference to the accompanying drawing wherein:—

Figure 1:
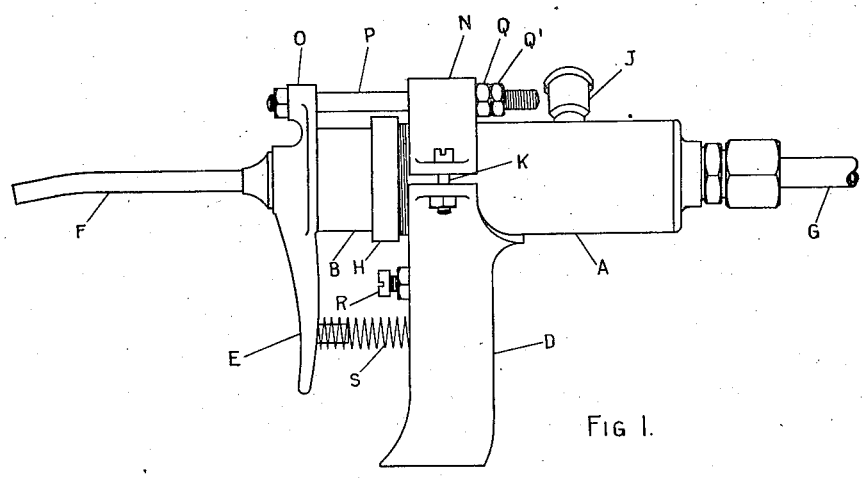
Figure 2:
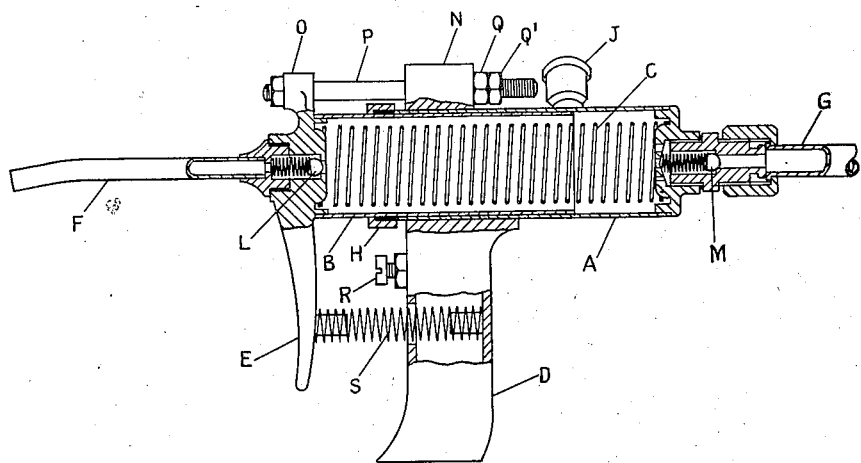

Figure 1 is side elevation of the invention, and
Figure 2 is a part sectional elevation of the same.

A is the outer tube and B the inner tube, the latter being adapted to snugly fit and move in the former. C is the spring shown within the inner tube B and outer tube A normally holding them in extended position as shown in the drawing. D is a hand piece upon the outer tube A, and E is a trigger or lever upon the inner or smaller tube B. F is a shaped tube for insertion into the animal's mouth, said tube F leading from the closed end of tube B. G is another tube which conveys the liquid from a container (not shown) to the outer tube A. H is a knurled nut adapted to hold packing and to screw over the inner end of the tube A. J is a grease cup for lubrication of the sliding surfaces of the tubes. K is a bolt for clamping the hand piece D to the tube A. L and M are spring controlled ball valves respectively in the pipe lines F and G. N and O are a boss and lug respectively upon tubes A and B and P is a graduated rod secured in the lug O and sliding in boss N. Rod P is threaded at its end which passes freely through boss N and is provided with nut and lock nut Q and Q'. R is a set screw and S a spring.

In use the container of medicinal fluid may be carried by the operator upon his back or be conveyed by any suitable means. The container is connected by a pipe line G with the outer end of the larger tube A of the gun.

The travel of the trigger E towards the hand piece D is limited by the set screw R so that when the two tubes A and B are closed the mark zero on the gauge rod P is in correct position. The gauge rod P which is graduated, is set by the nut Q upon its screwed end to the desired position for an individual dose, which is to say, the travel of the two telescoping tubes A and B away from each other is set at a maximum. Normally the fluid flows into the telescoping tubes A and B from the container via the non-return valve M, the non-return valve L at the other end being closed. After the mouth piece F has been inserted in the mouth of the animal a pressure of the hand upon the hand piece D and trigger E closes the two telescoping tubes A and B to their limit as set by the set screw R, the non-return valve L in the mouth piece F opens and the other non-return valve M closes enabling the fluid to be applied to the animal. Upon the release of the hand pressure upon the trigger E and hand piece D the springs C and S force the two tubes A and B apart to the limit set by the gauge rod P, the non-return valve L in the mouth piece F closes and that in the delivery pipe G opens enabling another charge to collect in the tubes A and B for subsequent application to another animal.

It will be obvious that the invention is adapted with slight modifications for use in injecting predetermined doses of serum and the like, and for douching purposes and the like.

I claim:—

1. An improved drenching gun consisting of a pair of telescoping tubes closed at their outer ends and provided with inlet and outlet pipes having non-return valves, a compression spring for normally extending the tubes, a hand piece upon one tube and a trigger upon the other tube, and a packing nut upon the inner end of the larger tube.

2. An improved drenching gun as claimed in claim 1 in combination with a lug and a boss upon the telescoping tubes, a graduated rod held in the lug at one end and passing freely through the boss, a nut for screwing upon the threaded end of said rod behind the boss, and a set screw upon the said hand piece adapted to engage the trigger.

3. An improved drenching gun consisting of a pair of telescoping tubes closed at their outer ends and provided with inlet and outlet pipes having non-return valves, a compression spring for normally extending the tubes, a hand piece upon one tube, and a trigger upon the other tube.

4. An improved drenching gun consisting of a pair of telescoping tubes closed at their outer ends and provided with inlet and outlet pipes having non-return valves, a compression spring for normally extending the tubes, a hand piece upon one tube and a trigger upon the other tube, and means for adjustably limiting the volume comprised between said pair of telescoping tubes.

DUDLEY RUSSELL DOWLING.